(12) United States Patent
Warnock

(10) Patent No.: US 7,753,392 B2
(45) Date of Patent: Jul. 13, 2010

(54) SLIDABLE FIFTH-WHEEL HITCH HAVING ADJUSTABLE GUIDES

(75) Inventor: K. Jeffrey Warnock, Victoria (CA)

(73) Assignee: Victoria Industries Ltd., Victoria, British Columbia (CA)

( * ) Notice: Subject to any disclaimer, the term of this patent is extended or adjusted under 35 U.S.C. 154(b) by 484 days.

(21) Appl. No.: 11/711,931

(22) Filed: Feb. 27, 2007

(65) Prior Publication Data

US 2008/0042397 A1 Feb. 21, 2008

Related U.S. Application Data

(63) Continuation-in-part of application No. 11/345,998, filed on Feb. 1, 2006, now Pat. No. 7,506,886.

(51) Int. Cl.
*B60D 1/36* (2006.01)
(52) U.S. Cl. .................. 280/477; 280/438.1; 280/441.1
(58) Field of Classification Search .............. 280/438.1, 280/441.1, 477
See application file for complete search history.

(56) References Cited

U.S. PATENT DOCUMENTS

| | | | |
|---|---|---|---|
| 599,245 A | 2/1898 | Merrill | |
| 725,662 A | 4/1903 | Bohlen | |
| 1,205,351 A | 11/1916 | Johnson | |
| 1,408,530 A | 3/1922 | Pierce | |
| 1,995,920 A | 3/1935 | Gurton et al. | |
| 2,078,492 A | 4/1937 | Gurton et al. | |
| 2,807,477 A | 9/1957 | Tuso, Jr. | |
| 3,561,076 A | 2/1971 | Gunther | |
| 3,729,214 A | 4/1973 | Mulcahy et al. | |
| 3,826,516 A | 7/1974 | Weber | |
| 3,834,736 A | 9/1974 | Dodgson | |
| 3,917,314 A * | 11/1975 | Neal ........................... | 280/432 |
| 4,721,323 A * | 1/1988 | Czuk et al. ................... | 280/433 |
| 4,738,127 A | 4/1988 | Johnson | |
| 4,744,581 A | 5/1988 | Cables | |
| 4,960,288 A | 10/1990 | Chambers | |
| 4,997,218 A | 3/1991 | Culling | |
| 5,044,651 A | 9/1991 | Weikel | |
| 5,449,191 A * | 9/1995 | Cattau ........................ | 280/438.1 |
| 5,551,815 A | 9/1996 | Rainbow et al. | |
| 5,772,229 A | 6/1998 | Cattau | |
| 5,839,745 A * | 11/1998 | Cattau et al. ................. | 280/434 |
| 6,065,766 A * | 5/2000 | Pulliam .................... | 280/415.1 |
| 6,135,482 A * | 10/2000 | Larkin ...................... | 280/416.1 |
| 6,161,402 A | 12/2000 | Moore | |

(Continued)

*Primary Examiner*—Lesley Morris
*Assistant Examiner*—Michael R Stabley
(74) *Attorney, Agent, or Firm*—Klarquist Sparkman, LLP

(57) ABSTRACT

A slidable trailer hitch apparatus comprises a trailer hitch head operable to receive a cooperating portion of a trailer, the trailer hitch head adapted to be slidable and rotatable relative to the vehicle about an axis of rotation, first and second parallel spaced part guides fixedly located relative to the vehicle, and a body affixed to and rotatable with the trailer hitch head, the body having a center of rotation about the axis and a distal surface adapted to engage either of the first or second guides when the body is rotated relative to the first and second guides. The engagement of the distal surface upon either of the first or second guides displaces the center of the body and the trailer hitch head parallel to the first or second guide when the trailer hitch head is rotated relative to the first and second guides.

56 Claims, 11 Drawing Sheets

U.S. PATENT DOCUMENTS

| | | |
|---|---|---|
| 6,247,720 B1 | 6/2001 | Linger et al. |
| 6,308,977 B1 * | 10/2001 | Pulliam et al. ............... 280/441 |
| 6,357,777 B1 | 3/2002 | Linger et al. |
| 6,386,570 B2 * | 5/2002 | Linger et al. ................ 280/441 |
| 6,427,496 B1 | 8/2002 | Hurst |
| 6,467,791 B1 | 10/2002 | Fandrich et al. |
| 6,485,045 B1 * | 11/2002 | King ....................... 280/417.1 |
| 6,488,305 B2 * | 12/2002 | Laarman .................. 280/438.1 |
| 6,502,846 B2 | 1/2003 | Fandrich et al. |
| 6,554,310 B2 * | 4/2003 | Babin ...................... 280/441.1 |
| 6,557,883 B2 | 5/2003 | Linger et al. |
| 6,682,089 B2 | 1/2004 | McCoy et al. |
| 6,685,210 B2 | 2/2004 | Lindenman et al. |
| 6,837,511 B1 | 1/2005 | Johnson, III |
| 6,935,650 B2 * | 8/2005 | Grinde et al. ............... 280/435 |
| 7,475,899 B2 * | 1/2009 | Crawley .................... 280/435 |
| 7,543,837 B2 * | 6/2009 | Crawley .................... 280/434 |

* cited by examiner

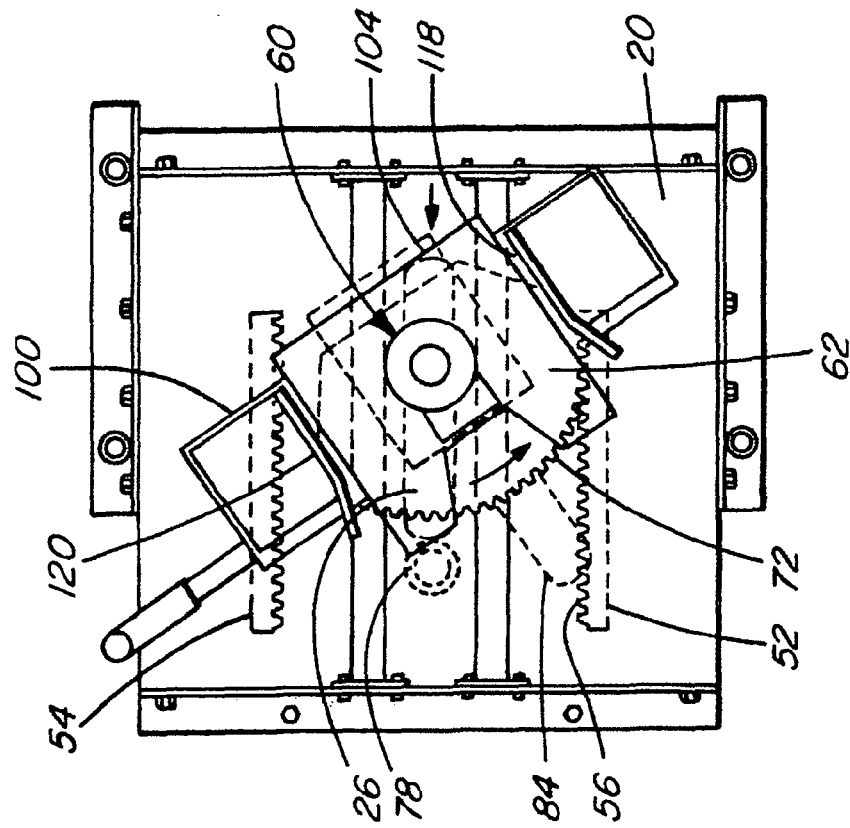
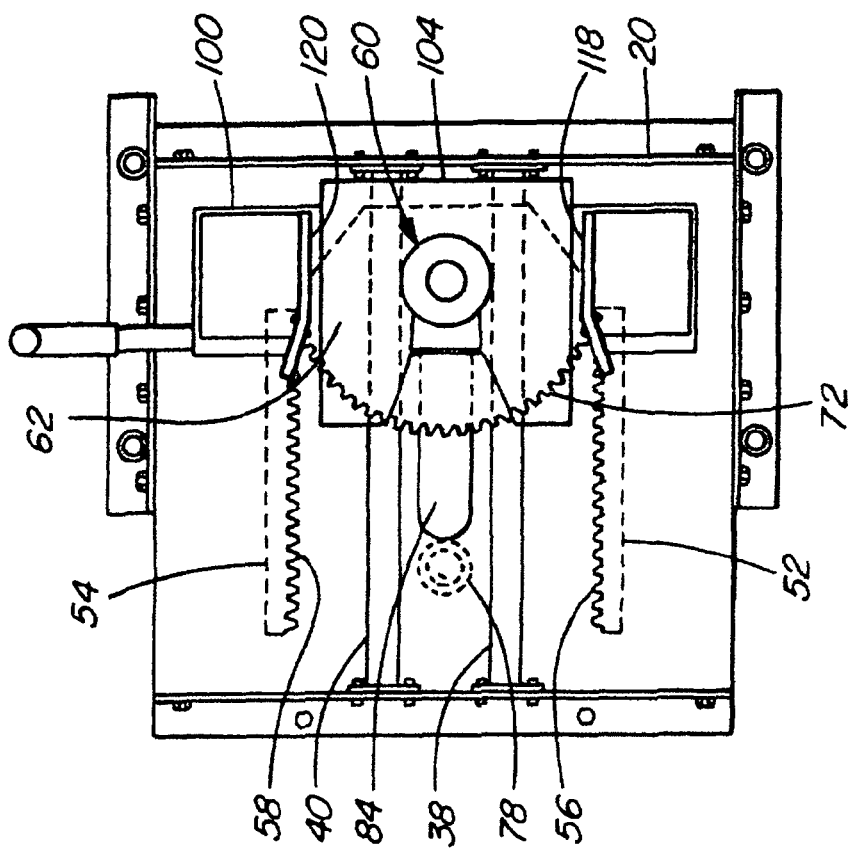
FIG. 4b
FIG. 4a

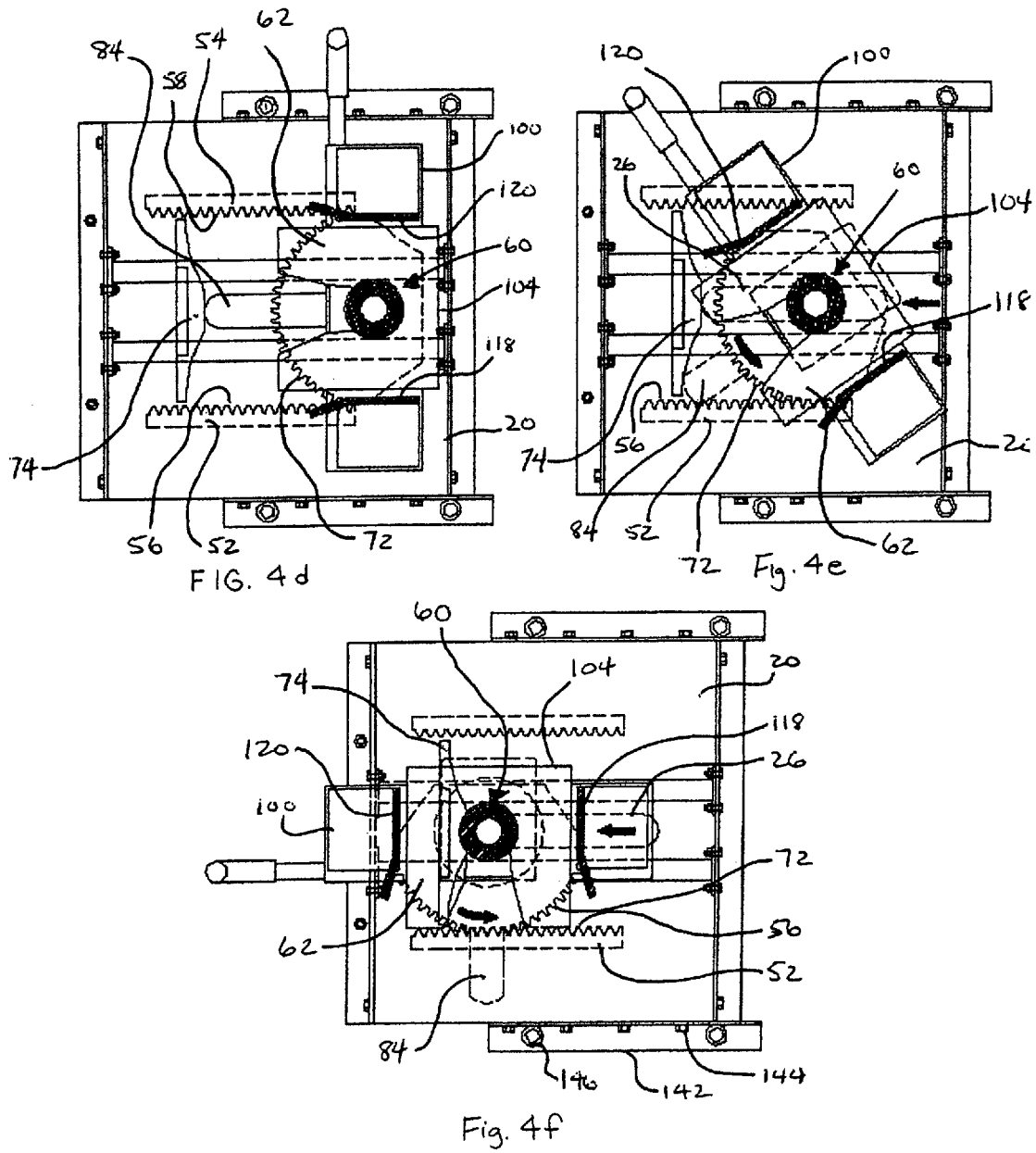

SLIDABLE FIFTH-WHEEL HITCH HAVING ADJUSTABLE GUIDES

CROSS REFERENCE TO RELATED APPLICATION

This application is a continuation-in-part of U.S. patent application Ser. No. 11/345,998, filed Feb. 1, 2006, which is incorporated herein by reference.

BACKGROUND

1. Field

This disclosure relates to hitches for connecting a trailer to a vehicle, and more particularly, to a method and apparatus for adjustably securing a portion of a trailer to a sliding a fifth-wheel trailer hitch head assembly.

2. Description of Related Art

Trailers are often secured to a vehicle so as to enable the vehicle to tow a load or a trailer containing recreational living quarters. Various means have been adapted for connecting the trailer to the tow vehicle including what is known in the art as a fifth-wheel trailer hitch.

In a fifth-wheel trailer hitch, the trailer includes a forwardly projecting arm which includes a vertical kingpin projecting out of a horizontal portion of the pin box. The kingpin is received within a corresponding slot of a trailer hitch plate located on the tow vehicle. The kingpin is then secured in the slot of the trailer hitch plate so as to enable the tow vehicle to tow the trailer.

The fifth-wheel trailer hitch assembly has many advantages that make it attractive for use in towing large trailers. Particularly, the engagement of a pin in a horizontal surface of the trailer hitch assembly allows the trailer hitch of a fifth-wheel hitch assembly to be located at any location on a vehicle desired by a user. Correspondingly, a ball-type trailer hitch assembly is limited to being located at the rear of a vehicle.

The ability to locate the trailer hitch assembly at any location desired by the user enables the trailer hitch of fifth-wheel hitch assembly to be located at the center of the vehicle at a point between the two rear wheels above the rear axle. Locating the trailer hitch assembly above the rear axle serves to transfer the portion of the weight of the trailer applied on the trailer arm to a position above the axles rather than at a distance from the axles as in the case of a ball joint. This serves to reduce stresses imparted to the frame and bumper of a tow vehicle. In addition the weight transferred to the rear tires of the tow vehicle is not increased by as great a degree as is the case in a ball hitch where the distance from the ball hitch to the rear axle creates a moment arm thereby increasing the weight applied to the rear tires.

A conventional fifth-wheel trailer hitch assembly, however, includes several deficiencies. When the tow vehicle is towing the trailer in a straight line, the front edge of the trailer and the rear edge of the tow vehicle will be in a parallel orientation to each other. As the tow vehicle negotiates a turn, however, the front edge of the trailer will be rotated relative to the rear edge of the tow vehicle. This will bring one corner of the trailer closer to its opposing corner of the tow vehicle. If the trailer arm connecting the trailer to the fifth-wheel hitch is not long enough, when the tow vehicle negotiates a turn, the aforementioned corner of the trailer may become quite close to or even contact its corresponding corner of the tow vehicle.

Accordingly, relatively long trailer arms are necessary to provide ample clearance between the trailer and the tow vehicle during all anticipated orientations of the trailer relative to the tow vehicle. Opposing the requirement for longer trailer arms, is the requirement to maintain efficient operation of the vehicle and trailer. In order to maintain efficient operation of the vehicle and trailer, it is desirable to maintain the distance between the trailer and the tow vehicle as low as possible so as to reduce drag and instability.

In the past, a balance has been struck when selecting the distance between the trailer and the tow vehicle so as to allow efficient operation while still enabling sufficient range of maneuverability. What is desirable is to provide a fifth-wheel hitch assembly which is able to move rearward while turning to enable ample maneuverability of the tow vehicle and trailer while being able to be subsequently moved forward to an optimal straight line tow position thereby shortening the distance between the tow vehicle and the trailer.

Various attempts have been made to provide a trailer hitch assembly that is moveable with respect to the tow vehicle so as to increase the maneuverability of the tow vehicle and trailer. For example, various attempts have been made to provide a sliding trailer hitch assembly which is lockable at a plurality of positions. In such a trailer hitch assembly, a user may unlock the sliding hitch assembly and slide it to a second position. At the second position, the vehicle and trailer may negotiate a tight turn. Thereafter, the user may unlock the sliding trailer hitch assembly from the second position and slide it back to a first position. Examples of such attempts may be shown in U.S. Pat. No. 6,357,777.

Such trailer hitch assemblies having a sliding lockable assembly are not able to automatically move the pivot point of the fifth-wheel hitch assembly rearward when the vehicle begins to negotiate a turn. Rather the entire trailer and tow vehicle must be stopped so that the user may manually reposition the hitch assembly. When the vehicle and trailer have completed the turn, the vehicle must once again be stopped so that the hitch assembly may be moved back to it's preferred straight line towing position. This is a time consuming process that a user is required to undertake before performing any turns of greater than a given radius. In addition, if the user neglects to perform these activities before negotiating the turn, the aforementioned damage of the trailer impacting the tow vehicle may still occur.

In addition, various attempts have been made to provide a pair of substantially perpendicular slots with a common body having a pivot in each of the slots. The body is connected to the trailer wherein the slots are located on a vehicle. When the trailer and thereby the body is rotated relative to the slots and the vehicle, the pivot located in a slot perpendicular to the vehicle is displaced laterally in the vehicle thereby allowing a pivot located in a slot parallel to the vehicle to be displaced longitudinally relative to the vehicle. As the trailer hitch is mounted substantially above the second pivot point, the trailer hitch will accordingly be displaced longitudinally in the vehicle as the vehicle and trailer negotiate a turn. The resulting assembly is highly dependent upon anti-friction means such as grease or bearings. Accordingly, if the assembly is not maintained properly, large angle turns negotiated by the tow vehicle may induce too large a force on the assembly and may therefore jam the assembly. Examples of such a system may be seen in U.S. Pat. No. 6,308,977.

Previous pivotable hitches have also suffered from the difficulty of requiring an additional adapting plate to be affixed to the trailer for engaging the pivotable truck mounted hitch. The adapting plate has a shape corresponding to an opening in the pivotable hitch. Such adapting plates, however, are time consuming to install and limit the ability of a non-cooperating truck mounted hitch to pull such a trailer.

What would be desirable is a method and apparatus for engaging a portion of a trailer to a truck mounted trailer that is readily adaptable to receive trailer portions of varying dimensions without requiring modification to the trailer.

What would also be desirable is a simple way of providing a sliding fifth-wheel hitch assembly operable to automatically displace the pivot point of a trailer rearward in the tow vehicle as the tow vehicle and trailer negotiate a turn and thereafter return the pivot point back to the pre-selected straight line towing position when the trailer and tow vehicle complete the turn.

SUMMARY

Accordingly, the present invention provides an apparatus for displacing a hitch for connecting a trailer to a vehicle, the apparatus comprising:
- a trailer hitch head operable to receive a cooperating portion of a trailer, the trailer hitch head adapted to be slidable and rotatable relative to the vehicle about an axis of rotation;
- first and second parallel spaced part guides fixedly located relative to the vehicle; and
- a body affixed to and rotatable with said trailer hitch head, the body having a center of rotation about said axis, a first orientation and a distal surface adapted to engage either of said first or second guides when said body is rotated relative to said first and second guides,
- whereby said engagement of the distal surface upon either of the first or second guides displaces said center of said body and said trailer hitch head parallel to said first or second guide when said trailer hitch head is rotated relative to said first and second guides.

The present invention also provides an apparatus for rotationally fixing a trailer hitch head to a portion of a trailer hitch having a pin and parallel side surfaces, the apparatus comprising a rotatable trailer hitch head having a pair of adjustable opposed spaced apart hitch guides, said trailer hitch head being slidably moveable in response to rotation of said trailer hitch head.

The present invention also provides an apparatus for displacing a hitch for connecting a trailer to a vehicle, the apparatus comprising:
- a trailer hitch head operable to receive a cooperating portion of a trailer between an opposed pair of adjustable hitch guides, the trailer hitch head adapted to be slidable and rotatable relative to the vehicle about an axis of rotation;
- first and second spaced, parallel displacing guides fixedly located relative to the vehicle; and
- a body affixed to and rotatable with said trailer hitch head, the body having a center of rotation about said axis, a first orientation and a distal surface adapted to engage either of said first or second displacing guides when said body is rotated relative to said first and second displacing guides,
- whereby said engagement of the distal surface upon either of the first or second displacing guides displaces said center of said body and said trailer hitch head parallel to said first or second displacing guide when said trailer hitch head is rotated relative to said first and second displacing guides.

In a further aspect, the present invention provides a method of displacing a hitch for connecting a trailer to a vehicle, the method comprising:
providing a trailer hitch head adapted to be slidably and rotatably connected about an axis to the vehicle, the trailer hitch head being adapted to fixably engage the trailer; and rotating a body having a distal surface with said trailer hitch head, the body being affixed to and coaxial with said trailer hitch head so as to engage said distal surface on either of a pair of spaced apart guides such that the axis of the body and trailer hitch head are displaced relative to said guides when said trailer hitch head is rotated with the trailer.

In a further aspect, there is provided a method of displacing a hitch for connecting a trailer to a vehicle, the method comprising:
providing a trailer hitch head adapted to be slidably and rotatably connected about an axis to the vehicle, the trailer hitch head being adapted to fixably engage a cooperating portion of the trailer between an opposed pair of adjustable hitch guides; and
rotating a body having a distal surface with said trailer hitch head, the body being affixed to and coaxial with said trailer hitch head so as to engage said distal surface on either of a pair of spaced apart displacing guides such that the axis of the body and trailer hitch head are displaced relative to said displacing guides when said trailer hitch head is rotated with the trailer.

In a still further aspect, the present invention provides a method of rotationally fixing a rotatable trailer hitch head to a portion of a trailer hitch, the method comprising:
providing a vehicle mounted rotatable trailer hitch head having a pair of adjustable opposed spaced apart hitch guides;
locating a pin attached to the portion of the trailer within a slot of said trailer hitch head, the portion having parallel side surfaces; securing said pin within said slot; and
positionally securing said hitch guides to said trailer hitch head adjacent to said side surfaces to prevent rotation between said trailer portion and said trailer hitch head.

The apparatus and method of the present invention allow for automatic displacement of the pivot point of a trailer rearward in the tow vehicle as the tow vehicle and trailer negotiate a turn, and thereafter automatic return of the pivot point to the straight line towing position when the trailer and tow vehicle complete the turn.

BRIEF DESCRIPTION OF THE DRAWINGS

Aspects of the present invention are illustrated, merely by way of example, in the accompanying drawings:

FIGS. 4a-4c are process diagrams showing successive stages in the operation of the sliding fifth-wheel trailer hitch of FIG. 1.

FIGS. 4d-4f are process diagrams showing successive stages in the operation of the sliding fifth-wheel trailer hitch according to the alternative embodiment of FIGS. 2A and 3A.

DETAILED DESCRIPTION

Figure 1:
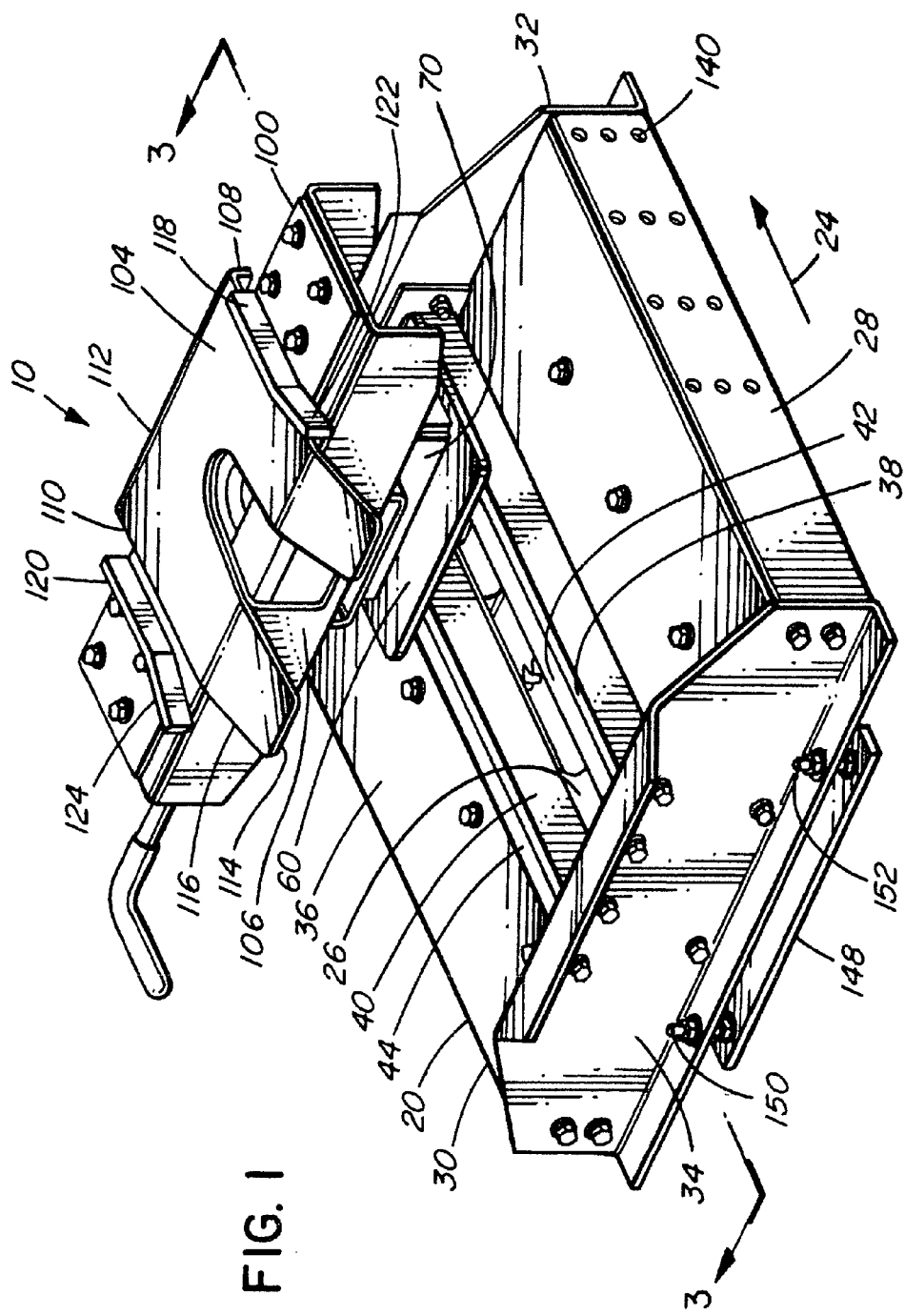
FIG. 1 is a perspective view of the sliding fifth-wheel trailer hitch according to a first embodiment of the present invention.

Referring to FIG. 1, a trailer hitch according to a first embodiment of the invention is shown generally at 10. The trailer hitch comprises a frame 20 mountable to a bed of a vehicle (not shown), a slide assembly shown generally at 60, and a trailer hitch head assembly 100. The frame is mounted longitudinally in the bed of the vehicle wherein the longitudinal direction of the vehicle is shown generally at 24. The slide assembly is slidably and rotatably received within a top slot 26 in the frame 20 and supports the trailer hitch head assembly 100.

The frame comprises a body having first and second sides 28 and 30, a front and a rear end 32 and 34 respectively and a top 36. The top includes first and second parallel spaced apart top guides 38 and 40 wherein the first and second top guides define a longitudinal top slot 26 therebetween. The first and second top guides 38 and 40 comprise elongated raised portions extending from the top 36 of the frame between the front end and the rear ends 32 and 34 respectively. The first and second top guides 38 and 40 further include top surfaces 42 and 44 operable to support the slide assembly 60.

Figure 2:
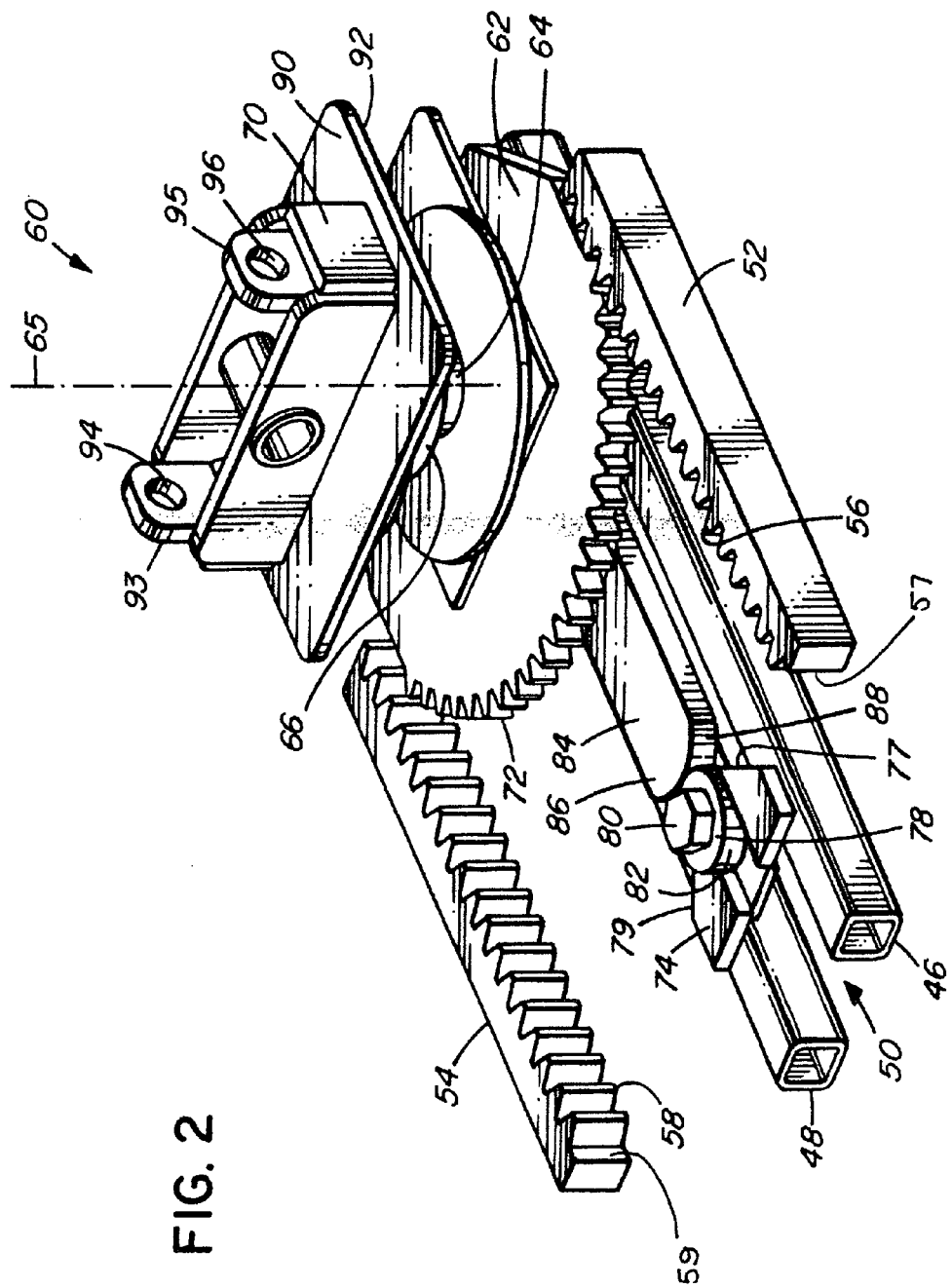
FIG. 2 is a perspective view of the slide assembly, bottom guides and toothed guides of the sliding fifth-wheel trailer hitch of FIG. 1.

Turning now to FIG. 2, a slide assembly is shown generally at 60. The slide assembly 60 is comprised of a toothed gear portion 62 mounted on a shaft 64 having an axis 65. The shaft 64 further supports first and second bearings 66 and 68 (not shown in FIG. 2) about axis 65 and a trailer hitch head mounting assembly 70 at a top end of the shaft. The first bearing 66 is adapted to be slidingly received between first and second top guides 38 and 40 of the frame. The second bearing 68 is adapted be slidingly received between first and second bottom guides 46 and 48 respectively wherein the bottom guides 46 and 48 are attached to a bottom portion of the frame 20. The bottom guides 46 and 48 form a bottom slot 50 therebetween in which the second bearing 68 is received.

As shown in FIG. 2, first and second toothed displacing guides 52 and 54 are located in parallel spaced apart positions with the toothed gear portion therebetween. The first and second toothed displacing guides 52 and 54 are connected to the frame 20 so as to be fixably located relative to the frame. The first and second toothed displacing guides 52 and 54 include a plurality of teeth 56 and 58 oriented along displacing surfaces 57 and 59, respectively, operable to engage the gear teeth 72 of the gear portion 62.

The first and second bottom guides 46 and 48 further includes a bridging plate 74 bridging bottom slot 50 between the first and second bottom guides 46 and 48. The bridging plate 74 includes a first end and side surfaces 77 and 79 wherein a bearing 78 is secured to the first end 76 of the bridging plate 74 by a bolt 80. The bearing 78 further includes an external circular bearing surface 82.

The slide assembly further includes a gear bar 84. The gear bar extends radially away from the shaft 64 and includes a distal end 86 having an external bearing surface 88. As shown in FIG. 2, the gear bar is connected to the gear portion 62, however, the gear bar may also be coaxially connected to the shaft 64. In addition, the slide assembly further includes a support plate 90 having a bottom surface 92 adapted to slidingly engage the top surfaces 42 and 44 of the first and second top guides 38 and 40 respectively. The trailer hitch head mounting assembly 70 further includes a means for securing the trailer hitch head assembly. As shown in FIG. 2, the means for mounting the trailer hitch head assembly may comprise a pair of spaced apart uprights 93 and 95 having respective bores 94 and 96 adapted to receive bolts or a pin connected to the trailer hitch head assembly.

The trailer hitch head assembly includes a hitch plate 104 wherein the hitch plate 104 includes a U-shaped slot 106 adapted to receive a corresponding pin on a trailer. The hitch plate 104 includes first and second sides 108 and 110 respectively and a front edge and a rear edge 112 and 114 respectively. The rear edge 114 may include a downwardly inclined portion 116 so as to assist in the engagement of a trailer to the trailer hitch assembly. The trailer hitch head assembly further includes first and second parallel spaced apart hitch guides 118 and 120 respectively located adjacent to the first and second sides 108 and 110 respectively of the hitch plate 104. The first and second parallel spaced apart hitch guides 118 and 120 comprise an upstanding member having a length substantially parallel to the trailer hitch plate. The first and second spaced apart hitch guides 118 and 120 may further include an outwardly angled portions 122 and 124 respectively so as to assist in guiding the trailer hitch portion into the slot of the trailer hitch head.

Figure 3:
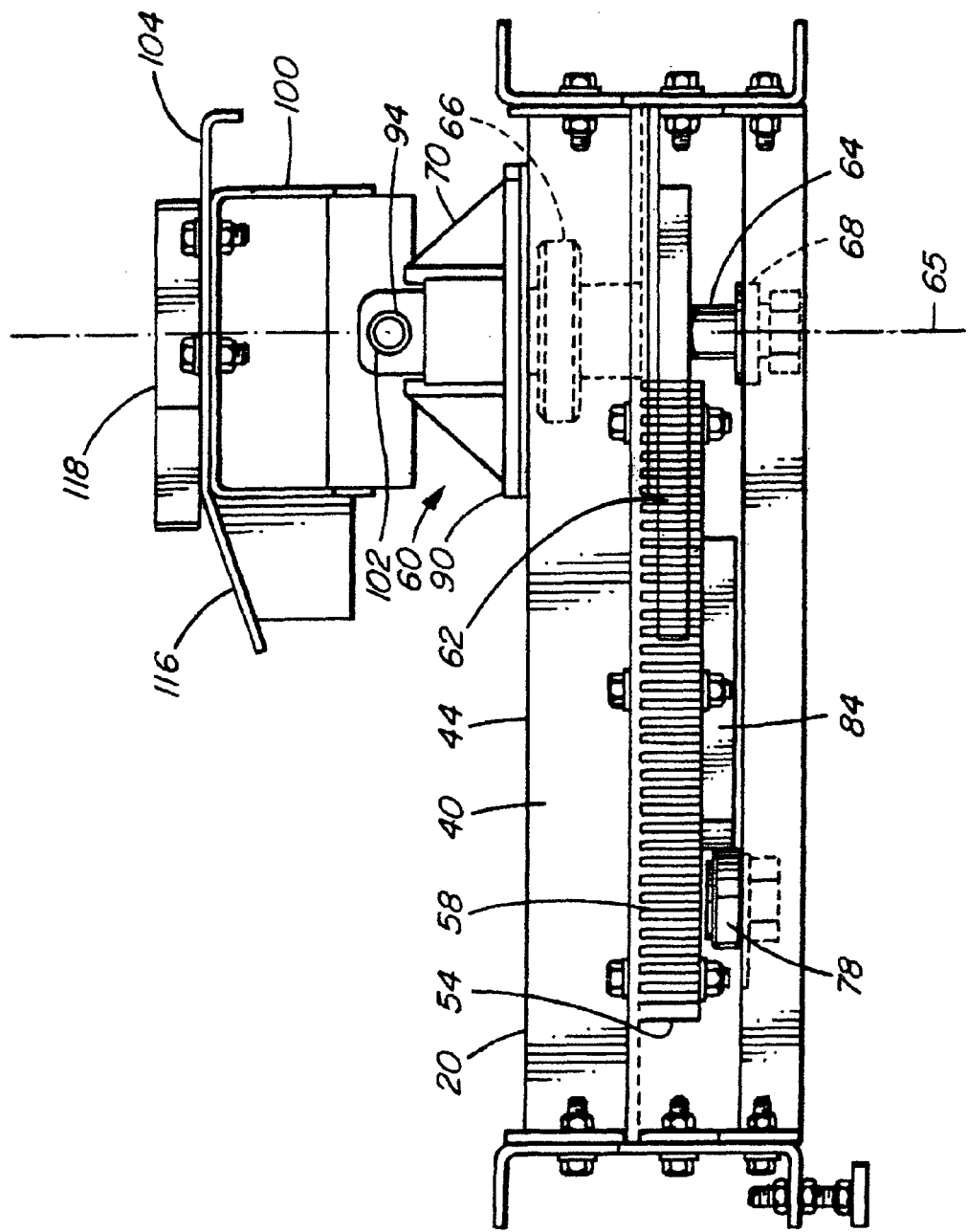
FIG. 3 is a cross sectional view of the sliding fifth-wheel trailer hitch of FIG. 1 taken along line 3-3 of FIG. 1.

Turning now to FIG. 3, a side view of an assembled sliding trailer hitch assembly is shown according to a first embodiment of the present invention. As shown in FIG. 3, the trailer hitch head assembly 100 is attached to the trailer hitch head mounting assembly 70 by passing a pin 102 connected to the trailer hitch head assembly through bores 94 and 96. As shown in FIG. 3, the slide assembly 60 is received in the frame 20 wherein the support plate 90 rests on the top surfaces 42 and 44 of the first and second top guides 38 and 40. The first bearing 66 is received between the first and second top guides 38 and 40 wherein the second bearing 68 is received between the first and second bottom guides 46 and 48. The gear portion 62 is received between the first and second toothed displacing guides 52 and 54 while the gear bar 84 extends radially from the gear portion so as to engage upon the bearing 78.

Figure 4C:
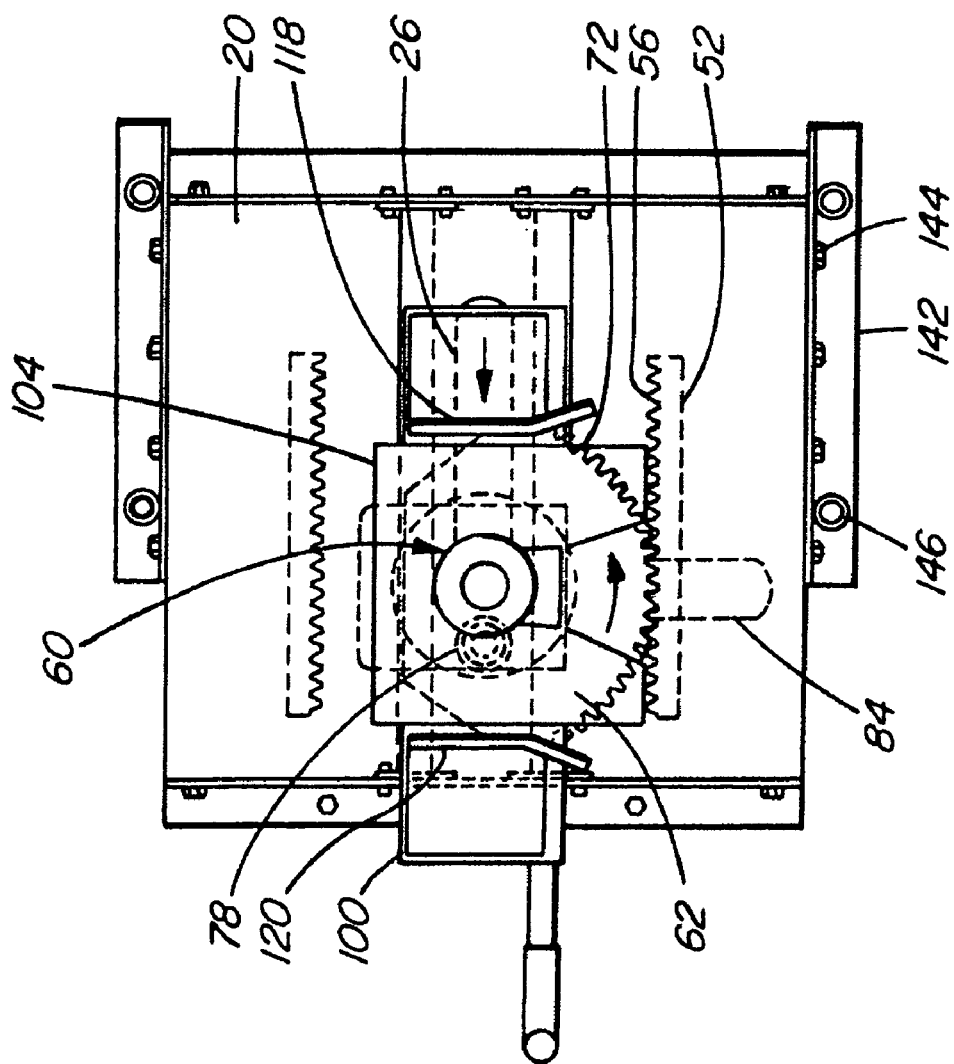

Referring back to FIG. 1, the frame may includes a plurality of mounting holes 140 located on the first and second sides 28 and 30 of the frame 20. The frame 20 may be secured to the bed of a vehicle by means of attaching brackets 142 to the mounting holes 140 by way of bolts 144 as shown in FIG. 4c. The mounting bracket 142 may then be secured to a rail system (not shown) by bolts 146 wherein the rail system is thereby secured to the bed of a vehicle. The rail system may thereafter permit the frame to be located at a plurality of positions within the bed of the vehicle. The frame 20 may also be secured to the bed of a vehicle by means of a load distributing bar 148. The load distributing bar 148 is secured to the bed of a vehicle and is attached to the frame 20 by means of bolts 150 and 152 as shown in FIG. 1. It will be appreciated that when the trailer hitch head assembly and slide assembly are at a rear-most position as shown in FIG. 4c, additional loads and torques may be applied to the bolts 146 and 144 on the mounting brackets 142 due to the longitudinal distance between the applied load at the trailer hitch head assembly and the location of bolts 144 and 146. Load distributing bar 148 may reduce these loads and torques by providing an additional support point closer to the applied load when the trailer hitch head assembly is at a rearmost location.

Figure 2A:
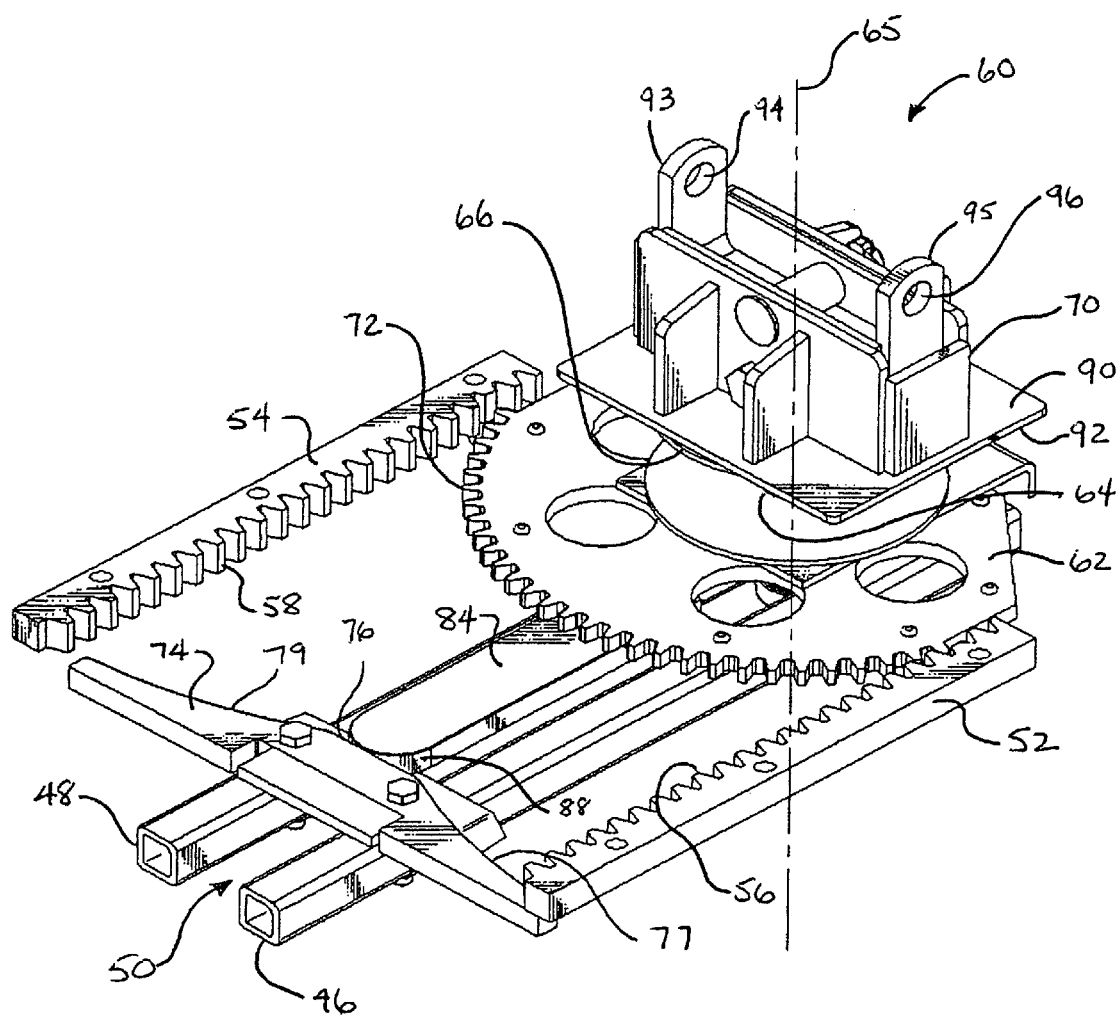
FIG. 2A is a perspective view of an alternative arrangement of the trailer hitch using an elongated bridging plate.
Figure 3A:
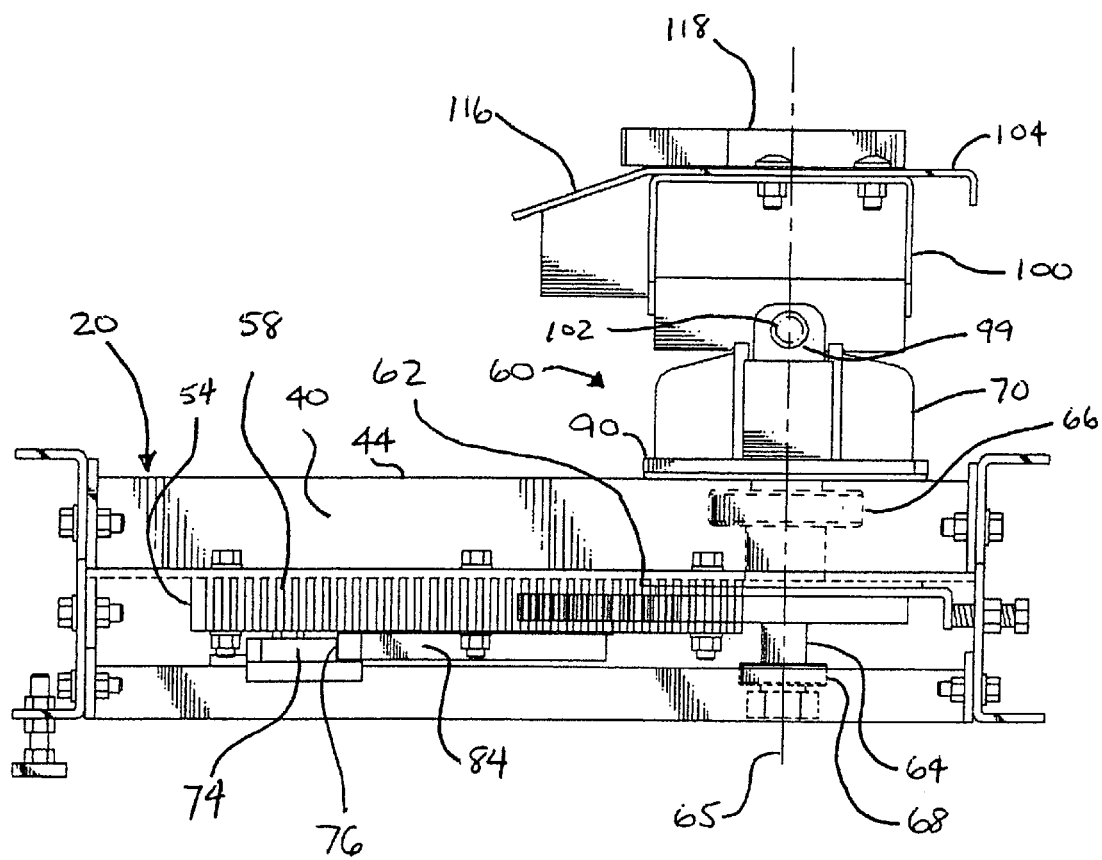
FIG. 3A is a cross sectional view of the alternative arrangement of FIG. 2A.

FIGS. 2A and 3A show an alternative embodiment of the trailer hitch which employs an alternative arrangement for controlling the movement of gear bar 84. In FIGS. 2A and 3A, similar parts have the same reference number. The embodiment of FIGS. 2A and 3A employs a transition bar to guide the movement of gear bar 84. The transition bar includes an elongated bridging plate 74 for bridging bottom slot 50 between the first and second bottom guides 46 and 48. The elongated bridging plate 74 includes elongated side surfaces 77 and 79 which extend adjacent the toothed displacing guides 52 and 54. A first end 76 of elongated bridging plate 74 defines a bearing surface to engage with the bearing surface 88 of gear bar 84. This alternative arrangement avoids the use of a bearing 78, while elongated surfaces 77 and 79 act to provide additional control over the movement of gear bar 84. Otherwise, transition bar 76 functions in a similar manner to the arrangement shown in FIGS. 2 and 3.

Figure 5:
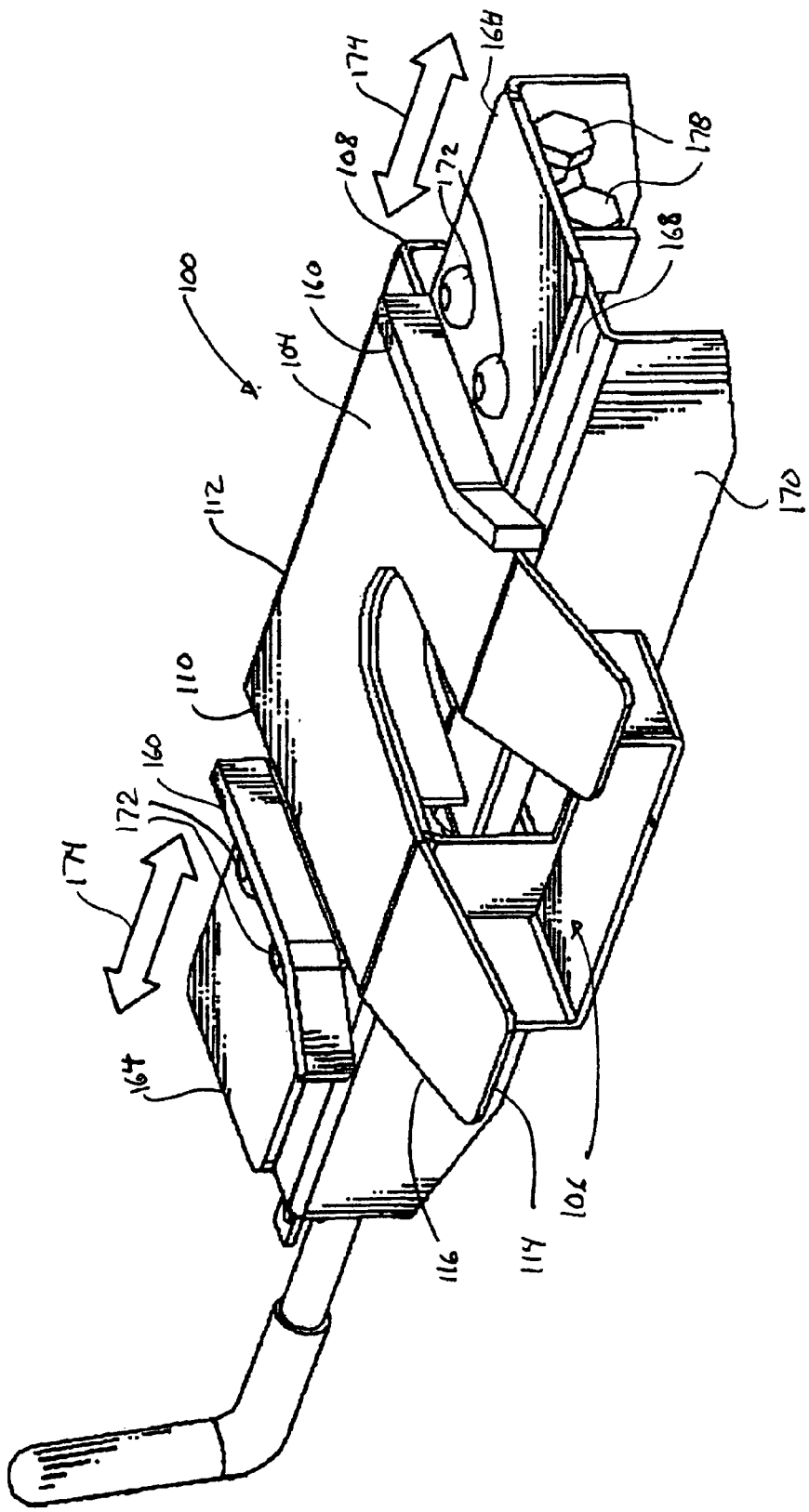
FIG. 5 is a perspective view of a trailer hitch head of the sliding fifth-wheel trailer hitch of FIG. 1 having adjustable trailer hitch guides.

Referring to FIG. 5, another embodiment of the trailer hitch head assembly 100 is shown having adjustable trailer hitch guides 160. Adjustable trailer hitch guides 160 include securing portions 164 which are parallel to a top plate 168 of the trailer hitch support 170. The adjustable trailer hitch guides 160 may be secured to the trailer hitch support 170 by securing bolts 172 or other suitable means. The trailer hitch support 170 may include slots (shown as 190 in FIG. 6) through which the securing bolts 172 pass so as to enable the adjustable trailer hitch guides 160 to be secured to the trailer hitch support 170 at a plurality of positions as indicated by arrows 174. The trailer hitch head assembly may also include adjusting bolts 178 for facilitating positioning of the adjustable trailer hitch guides 160 at a desired location as will be described in greater detail below.

Figure 6:
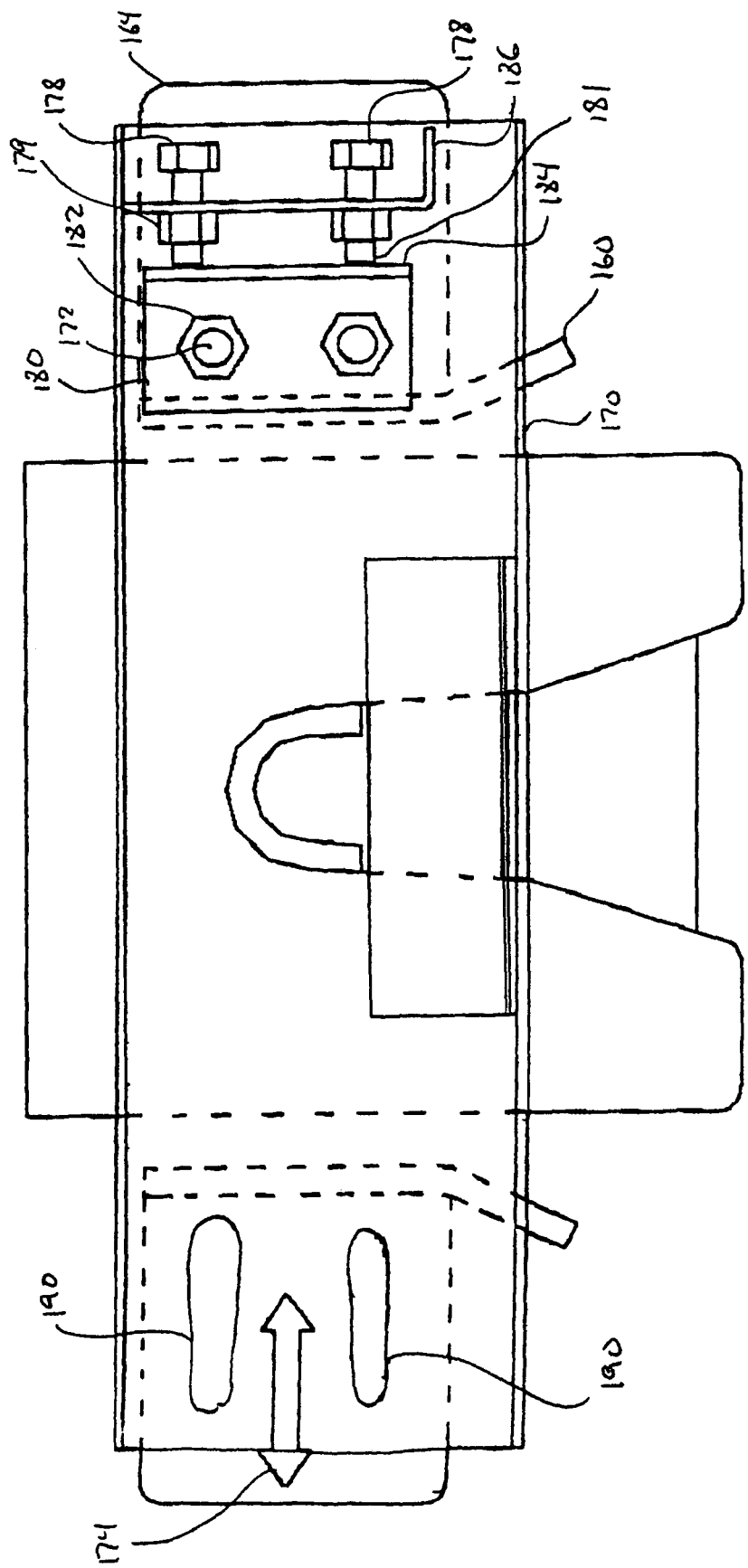
FIG. 6 is a bottom view of the trailer hitch head of FIG. 5 showing the underside of the adjustable trailer hitch guides.

Referring now to FIG. 6, a bottom view of the adjustable trailer hitch head assembly is provided showing the underside of one of the adjustable trailer hitch guides 160. As illustrated, the adjustable trailer hitch guides 160 may include a backing plate 180 which is operably connected to the securing portions 164 of the adjustable trailer hitch guides 160 with the top plate 168 of the trailer hitch support 170 therebetween. The backing plate 180 and the securing portions 164 may be connected by passing securing bolts 172 therethrough which may be threaded into nuts 182 below the backing plate 180 so as to retain the backing plate 180 and securing portion 164 together on opposed sides of the top plate 168. The backing plate 180 may include a downturned portion 184 adapted to be engaged by the adjusting bolts 178.

As shown in FIG. 6, the adjusting bolts 178 may be secured to the trailer hitch support 170 by securing brackets 186. The adjusting bolts 178 may be threadably secured within the securing brackets 186 or threaded through backing nuts 179 which are secured to the securing brackets 186. The adjusting bolts 178 include distal ends 181 which bear against the downturned portion 184 of the backing plates 180. The adjusting bolts 178 may optionally be longitudinally fixed and freely rotatable relative to the securing bracket 186. In this optional arrangement which is not shown, the distal ends of the adjusting bolts may be threaded into the downturned portion 184 of the backing plates 180.

Figure 7:
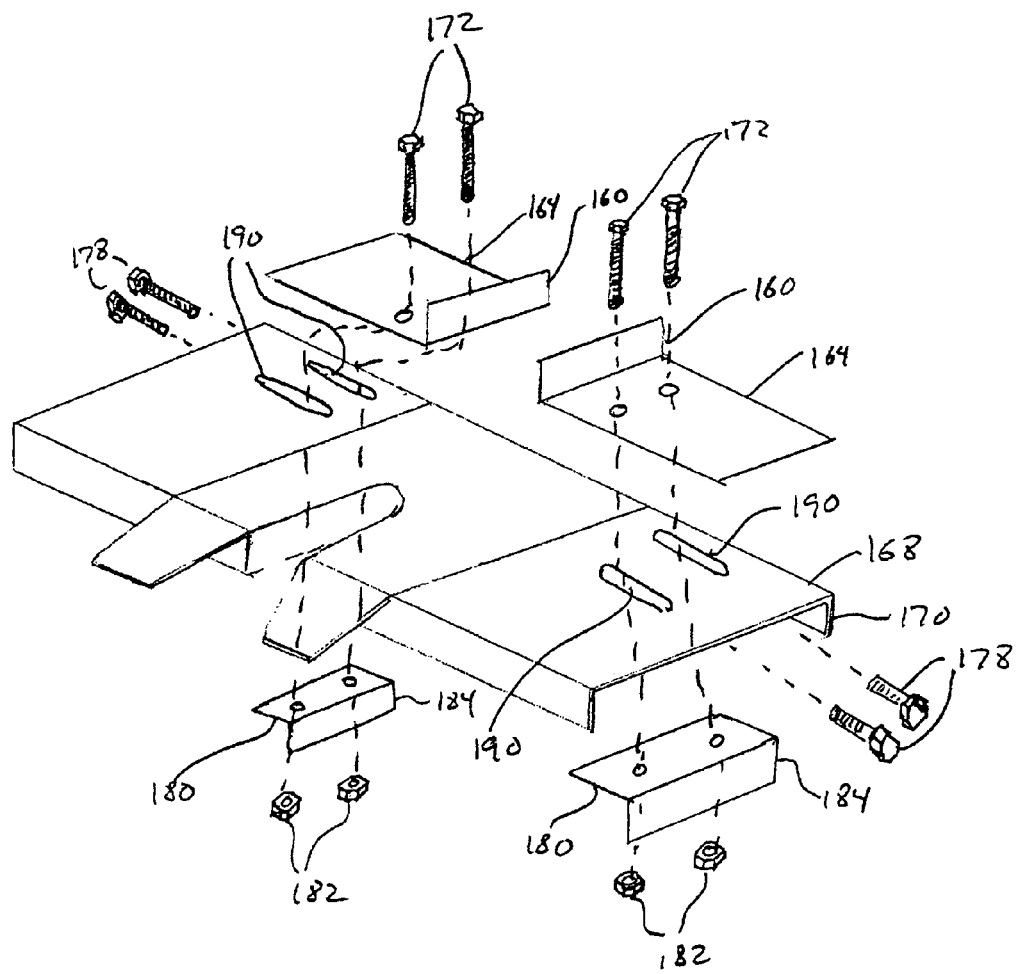
FIG. 7 is an exploded view of the trailer hitch head of FIG. 5

Referring now to FIG. 7, an exploded view of the adjustable trailer hitch head assembly is shown. As shown in FIG. 7, the top plate 168 of the trailer hitch support 170 includes slots 190 through which the securing bolts 172 may pass. The securing bolts 172 may be slidably located to a desired location within the slots 190 and thereafter tightened with the nuts 182 so as to secure the adjustable trailer hitch guides 160 at the desired location. Adjusting bolts 178 may also assist in urging the adjustable trailer hitch guides towards a portion of the trailer (not shown) so as to ensure the adjustable trailer hitch guides 160 closely engage the trailer.

Operation

In operation, a pin and support plate of a trailer may be received in the U-shaped slot 106 of the trailer hitch between first and second parallel spaced apart hitch guides 118 and 120. First and second spaced apart hitch guides 118 and 120 engage upon corresponding side surfaces of the trailer arm pin box thereby serving to align the trailer hitch head assembly 100 with the trailer. As shown in FIGS. 1, 2 and 3, the trailer hitch head assembly 100 is positioned longitudinally aligned to the frame 20 and the vehicle to which the frame is attached. In this orientation, when a trailer is mounted to the trailer hitch head assembly 100, the trailer and the tow vehicle will accordingly be in longitudinal alignment with each other. As the tow vehicle negotiates a turn, the tow vehicle and the trailer will move out of linear alignment with each other and there will therefore exist an angle between their respective longitudinal lengths. Due to the engagement of the first and second parallel spaced apart hitch guides 118 and 120 on the corresponding side surfaces of the pin box, the trailer hitch head assembly 100 will remain longitudinally aligned with the trailer thereby moving the trailer hitch head assembly 100 out of linear alignment with the frame 20 and the tow vehicle to which the trailer is attached.

Now referring to FIG. 4a to 4c, the sliding fifth-wheel hitch is shown in a series of three orientations. As shown in FIG. 4a, the sliding fifth-wheel hitch is shown according to the orientation shown in FIGS. 1 through 3 wherein the trailer, the tow vehicle and trailer hitch head assembly 100 are aligned with each other. As shown in FIG. 4a, the gear bar 84 aligns with and abuts against the bearing 78. In addition, the gear teeth 72 of gear portion 62 do not engage upon the teeth 56 or 58 of the first or second toothed displacing guides 52 and 54. In this orientation, sliding of the slide assembly 60 is resisted solely by the gear bar 84 bearing upon the bearing 78.

Now referring to FIG. 4b, the trailer hitch head assembly 100 is shown oriented in a second orientation in which the tow vehicle is negotiating a turn to the right. According to the second orientation shown in FIG. 4b, as the tow vehicle negotiates a turn to the right, the orientation of the tow vehicle relative to the trailer will be changed in a clockwise direction. Accordingly, the trailer hitch head assembly 100 will remain oriented with the trailer whereby the trailer hitch head assembly 100 is rotated counter-clockwise relative to the frame 20. As the trailer hitch head assembly 100 is rotated counter-clockwise, the slide assembly 60 is rotated clockwise by an equal amount thereby rotating the gear bar 84 out of alignment with the bearing 78. In addition, the gear teeth 72 of the gear portion 62 will be rotated into contact with the teeth 56 of the first toothed displacing guide 52. As the gear portion 62 is rotated relative to the first toothed displacing guide 52, the slide assembly 60 will be displaced laterally within the top slot 26 towards the rear of the tow vehicle.

Now referring to FIG. 4c, the tow vehicle and trailer have been oriented at 90° to each other such that the trailer hitch head assembly 100 has been equally rotated 90° relative to the frame 20. As shown in FIG. 4c, the gear teeth 72 have engaged upon the teeth 56 of the first toothed displacing guide 52 and rotated relative thereto. The slide assembly 60 has been accordingly laterally displaced within the top and bottom slots 26 and 50 respectively. The trailer hitch head assembly 100 has been displaced towards the rear of a vehicle with the slide assembly 60. It will be appreciated that although the rotation of the sliding trailer hitch assembly as shown in FIGS. 4a through 4c is shown wherein the tow vehicle is negotiating a turn to the right, the slide assembly may also be rotated in a direction clockwise relative to the frame assembly wherein the tow vehicle is negotiating a turn to the left. This will correspondingly cause the gear teeth 72 of the gear portion 62 to engage upon the teeth 58 of the second toothed displacing guide 54.

The rotation of the trailer hitch head assembly 100 relative to the frame causes the gear bar 84 to move out of alignment with the bearing 78 as well as cause the gear teeth 72 of the gear portion 62 to engage upon corresponding teeth 56 or 58 of one of the first or second toothed displacing guides 52 or 54. Accordingly, further rotation of the trailer hitch head assembly 100 relative to the frame causes the gear teeth 72 of the gear portion 62 to displace the slide assembly 60 and trailer hitch head assembly 100 relative to the frame 20 within the top and bottom slots 26 and 50 towards the rear of the vehicle.

FIGS. 4d to 4f show the operation of the alternative embodiment of the sliding fifth-wheel hitch illustrated in FIGS. 2A and 3A. As with the previously described embodiment, rotation of the trailer hitch head assembly 100 relative to the frame causes the gear bar 84 to move out of alignment with the first end 76 of elongated bridging plate 74 so that gear bar 84 engages with one of side surfaces 77 or 79 which guide and control the movement of the gear bar. At the same time, gear teeth 72 of the gear portion 62 engage upon corresponding teeth 56 or 58 of one of the first or second toothed displacing guides 52 or 54. Accordingly, further rotation of the trailer hitch head assembly 100 relative to the frame causes the gear teeth 72 of the gear portion 62 to displace the slide assembly 60 and trailer hitch head assembly 100 relative to the frame 20 within the top and bottom slots 26 and 50 towards the rear of the vehicle.

The displacement of the trailer hitch head assembly 100 relative to the frame 20 and thereby relative to the vehicle in a longitudinal direction serves to move the pivot point of the trailer relative to the tow vehicle towards the rear of the tow vehicle. The movement of the pivot point of the trailer relative to the tow vehicle towards the rear of the vehicle will serve to increase the distance between the front edge of the tow vehicle of the trailer and the rear of the tow vehicle thereby enabling greater maneuverability of the tow vehicle and trailer.

According to another embodiment of the trailer hitch as shown in FIGS. 5-7, the adjustable trailer hitch guides 160 may accept support plates of trailers of differing sizes. In operation, the adjustable trailer hitch guides 160 may be spread apart by a sufficient distance to accommodate the width of the support plate of the trailer. After the pin and support plate of the trailer are located within the U-shaped slot 106 and between the adjustable trailer hitch guides 160, respectively, the adjustable trailer hitch guides 160 may be adjusted so as to closely engage the support plate therebetween. The adjustable trailer hitch guides 160 may be so adjusted by slidably moving the securing bolts 172 within the slots 190 when loosened from their corresponding nuts 182. Once positioned at the desired locations, the adjustable trailer hitch guides 160 may be secured in place by tightening the nuts 182 upon the securing bolts 172 until backing plate 180 and the securing portion 164 securely retain the top portion 168 of the trailer hitch support 170 therebetween.

Optionally, the adjusting bolts 178 may be used to urge the adjustable trailer hitch guides 160 into close engagement with the support plate. The adjusting bolts 178 may be rotated within the backing nuts 179 or corresponding threading of the securing bracket 186 as illustrated in FIG. 6. Such rotation will longitudinally displace the adjusting bolts 178 and cause the distal ends 181 of the adjusting bolts 178 to bear against the downturned portions 184 of the backing plate 180. Further rotation will urge the backing plate 180 as well as the adjustable trailer hitch guides 160 to which they are connected through the securing bolts 172 in the direction of the support plate of the trailer. In an alternative optional arrangement, the adjusting bolts 178 may be freely rotatable within the securing bracket 186 wherein rotation of the adjusting bolts 178 threadably displaces the downturned portions 184 of the backing plates 180 into which the adjusting bolts are threaded.

It will be appreciated that the adjusting bolts 178 will also serve to retain the adjustable trailer hitch guides 160 against the support portion of the trailer during operation of the trailer hitch. As set out above the adjusting bolts 178 and their corresponding nuts 182 may also be tightened together to retain the adjustable trailer hitch guides 160 at the desired position.

While specific embodiments of the invention have been described and illustrated, such embodiments should be considered illustrative of the invention only and not as limiting the invention as construed in accordance with the accompanying claims.

What is claimed is:

1. An apparatus for rotationally fixing a trailer hitch head to a portion of a trailer hitch having a pin and parallel side surfaces, the apparatus comprising a rotatable trailer hitch head having a pair of opposed spaced apart hitch guides adjustably secured to said hitch head such that the distance therebetween may be adjusted to engage said parallel side surfaces of varying widths of said trailer hitch, said trailer hitch head being slidably moveable in response to rotation of said trailer hitch head.

2. The apparatus of claim 1 wherein said hitch guides are secured to said hitch head by releasable fasteners, wherein one of said hitch guides or said hitch head includes slots through which said fasteners pass, said slots permitting said hitch guides to be secured at a plurality of positions.

3. The apparatus of claim 2 wherein said hitch guides include a securing portion parallel to said hitch head, said securing portion includes said slots.

4. The apparatus of claim 2 wherein said hitch head includes said slots.

5. The apparatus of claim 2 wherein said slots are perpendicular to the hitch guides.

6. The apparatus of claim 2 wherein the other of said hitch guides or hitch head includes a bore for receiving said fastener.

7. The apparatus of claim 6 wherein said fastener comprises a securing bolt.

8. The apparatus of claim 7 further including a nut cooperating with said securing bolt to releasably secure said hitch guides to said hitch head.

9. The apparatus of claim 7 wherein said bore is threaded to engage said threading on said fastener.

10. The apparatus of claim 2 wherein said fastener comprises a threaded fastener.

11. The apparatus of claim 1 further including adjustors adapted to urge said hitch guides towards said portion of a trailer.

12. The apparatus of claim 11 wherein said adjustors comprise adjusting bolts threadably secured to said hitch head and having a distal end adapted to engage said guides.

13. The apparatus of claim 12 wherein said hitch guides further include backing plates wherein said hitch head is secured between said backing plates and said securing portions, said adjusting bolts engaging said backing plates.

14. The apparatus of claim 1 further comprising:
   first and second parallel, spaced displacing guides fixedly located relative to a vehicle; and
   a body affixed to and rotatable with said trailer hitch head, the body having a distal surface with a center of rotation about an axis of rotation of said trailer hitch head;

whereby engagement of the distal surface with one of the first and second displacing guides displaces said body and said trailer hitch head parallel to said displacing guides when said trailer hitch head is rotated relative to said displacing guides.

15. The apparatus of claim 14 further including a frame having first and second sides and a first end mountable to a vehicle wherein said bearing guides are secured to said frame.

16. The apparatus of claim 15 further including brackets for securing said frame to the vehicle.

17. The apparatus of claim 16 wherein said brackets are secured to said first and second sides of said frame.

18. The apparatus of claim 17 wherein said frame includes at least one mounting hole for connection to said bracket.

19. The apparatus of claim 18 wherein said frame includes a plurality of mounting holes for connecting said frame to said bracket at a plurality of locations.

20. The apparatus of claim 17 in which said brackets are secured to a rail system secured to a bed of the vehicle.

21. The apparatus of claim 20 further including a load distributing portion at said first end of the frame, said load distributing portion comprising a member adapted to be secured to the bed of the vehicle.

22. The apparatus of claim 21 further including a brace extending from the body and operable to prevent the displacement of said body and said trailer hitch head when said body is in a first orientation.

23. The apparatus of claim 22 wherein said brace comprises a member extending radially from said body.

24. The apparatus of claim 22 wherein said brace permits displacement of said body and said trailer hitch head when said body is rotated out of said first orientation.

25. The apparatus of claim 22 wherein said brace engages upon a corresponding bracing surface fixably located relative to the vehicle.

26. The apparatus of claim 25 wherein said bracing surface is located on a projection extending parallel to said axis.

27. The apparatus of claim 26 wherein said bracing surface is fixably attached to said frame.

28. The apparatus of claim 26 wherein said projection comprises a bearing.

29. The apparatus of claim 22 wherein said first orientation is parallel to the longitudinal orientation of the vehicle.

30. The apparatus of claim 29 wherein engagement of the distal surface with either of the first or second displacing guides displaces said trailer hitch head substantially longitudinally with respect to the vehicle.

31. The apparatus of claim 30 wherein engagement of the distal surface with either of the first or second displacing guides displaces said trailer hitch head towards the rear of the vehicle.

32. The apparatus of claim 14 wherein said first and second displacing guides each include a displacing guide surface operable to be engaged by said distal surface.

33. The apparatus of claim 32 wherein said distal surface is substantially circular having a radius about said axis of rotation.

34. The apparatus of claim 33 wherein said distal surface includes a plurality of radial projections adapted to be received in and interlocked with a plurality of notches on each of said displacing guide surfaces.

35. The apparatus of claim 34 wherein said plurality of radial rojections and notches comprise cogs.

36. The apparatus of claim 14 wherein said hitch guides are secured to said hitch head by releasable fasteners, wherein one of said hitch guides or said hitch head includes slots through which said fasteners pass, said slots permitting said hitch guides to be secured at a plurality of positions.

37. The apparatus of claim 36 wherein said hitch guides include a securing portion parallel to said hitch head, said securing portion including said slots.

38. The apparatus of claim 36 wherein said hitch head includes said slots.

39. The apparatus of claim 36 wherein said slots are substantially perpendicular to said hitch guides.

40. The apparatus of claim 36 wherein the other of said hitch guides or hitch head includes a bore for receiving said fastener.

41. The apparatus of claim 36 wherein said fastener comprises a threaded fastener.

42. The apparatus of claim 41 wherein said fastener comprises a securing bolt.

43. The apparatus of claim 42 further including a nut cooperating with said securing bolt to releasably secure said hitch guides to said hitch head.

44. The apparatus of claim 42 wherein said bore is threaded to engage said threading on said fastener.

45. The apparatus of claim 14 further including adjustors adapted to urge said hitch guides towards said portion of a trailer.

46. The apparatus of claim 45 wherein said adjustors comprise adjusting bolts threadably secured to said hitch head and having a distal end adapted to engage said guides.

47. The apparatus of claim 45 wherein said hitch guides further include backing plates wherein said hitch head is secured between said backing plates and said securing portions, said adjusting bolts engaging said backing plates.

48. A method of rotationally fixing a rotatable trailer hitch head to a portion of a trailer hitch, the method comprising:
providing a vehicle mounted rotatable trailer hitch head having a pair of adjustable opposed spaced apart hitch guides;
locating a pin attached to the portion of the trailer within a slot of said trailer hitch head, the portion having parallel side surfaces;
securing said pin within said slot; and
positionally securing said hitch guides to said trailer hitch head adjacent to said side surfaces to prevent rotation between said trailer portion and said trailer hitch head.

49. The method of claim 48 wherein said hitch guides are secured to said hitch head by releasable fasteners, wherein one of said hitch guides or hitch head includes slots through which said fasteners pass, said slots permitting said fasteners to be secured at a plurality of positions.

50. The method of claim 48 wherein providing a trailer hitch head comprises providing a trailer hitch head adapted to be slidably and rotatably connected about an axis to the vehicle, the trailer hitch head being adapted to fixably engage a cooperating portion of the trailer between an opposed pair of adjustable hitch guides, the method further comprising rotating a body having a distal surface with said trailer hitch head, the body being affixed to and coaxial with said trailer hitch head so as to engage said distal surface on either of a pair of spaced apart displacing guides such that the axis of the body and trailer hitch head are displaced relative to said displacing guides when said trailer hitch head is rotated with the trailer.

51. The method of claim 50 further including disengaging a brace affixed to said body when said body is rotated out of a first orientation so as to enable said body and said trailer hitch head to be displaced, wherein said brace opposes displacement of said body when said body is in said first orientation.

52. The method of claim 51 wherein said first orientation is oriented longitudinally with said vehicle.

53. The method of claim 50 wherein said body and trailer hitch head are displaced substantially longitudinally with respect to the vehicle.

54. The method of claim 50 wherein said body and trailer hitch head are displaced towards the rear of the vehicle as said body and trailer hitch head are rotated away from said first orientation.

55. The method of claim 50 wherein said hitch guides may be slidably adjusted to receive cooperating portions of a trailer of varying widths.

56. The method of claim 48 wherein providing a trailer hitch head comprises providing a trailer hitch head adapted to be slidably and rotatably connected about an axis to the vehicle, the trailer hitch head being adapted to fixably engage the trailer, the method further comprising rotating a body having a distal surface with said trailer hitch head, the body being affixed to and coaxial with said trailer hitch head so as to engage said distal surface with one of a pair of spaced apart guides such that the axis of the body and trailer hitch head are displaced relative to said guides when said trailer hitch head is rotated with the trailer.

* * * * *